(12) United States Patent
Asano et al.

(10) Patent No.: US 6,685,977 B1
(45) Date of Patent: Feb. 3, 2004

(54) METHOD FOR PRODUCTION OF FROZEN DESSERTS

(75) Inventors: Hirokazu Asano, Izumisano (JP); Hirokazu Maeda, Izumisano (JP)

(73) Assignee: Fuji Oil Co., Ltd., Osaka (JP)

( * ) Notice: Subject to any disclaimer, the term of this patent is extended or adjusted under 35 U.S.C. 154(b) by 445 days.

(21) Appl. No.: 09/710,572

(22) Filed: Nov. 9, 2000

(30) Foreign Application Priority Data

Dec. 15, 1999 (JP) .......................................... 11-355292

(51) Int. Cl.$^7$ ................................................ A23G 9/00
(52) U.S. Cl. ........................ 426/565; 426/578; 426/660; 426/524
(58) Field of Search ................................ 426/565, 660, 426/524, 329, 578

(56) References Cited

U.S. PATENT DOCUMENTS

| | | | |
|---|---|---|---|
| 4,927,654 A | * | 5/1990 | Barnett et al. ............... 426/548 |
| 5,112,964 A | * | 5/1992 | Aoe et al. ..................... 536/56 |
| 5,342,641 A | | 8/1994 | Masutake et al. ............ 426/549 |
| 5,609,904 A | * | 3/1997 | Koh et al. .................... 426/565 |
| 5,753,288 A | * | 5/1998 | Ogawa ......................... 426/100 |

FOREIGN PATENT DOCUMENTS

| | | |
|---|---|---|
| EP | 0301440 | 2/1989 |
| EP | 0736258 | 10/1996 |
| JP | 10229821 | 9/1998 |

OTHER PUBLICATIONS

European Search Report of European Patent Application No EP00310283, dated Apr. 20, 2001.

* cited by examiner

*Primary Examiner*—Nina Bhat
(74) *Attorney, Agent, or Firm*—Paul & Paul

(57) ABSTRACT

A method for production of frozen desserts that comprises adding water-soluble hemicellulose during the frozen dessert production process. It is possible to provide the functions of overrun properties and shape retention which are desired properties of stabilizing agents for frozen desserts, without giving the frozen desserts a heavy taste texture, while also imparting a soft, smooth taste texture and a light, fragile taste texture for ice desserts.

6 Claims, No Drawings

METHOD FOR PRODUCTION OF FROZEN DESSERTS

BACKGROUND OF THE INVENTION

1. Field of the Invention

The present invention relates to a method for the production of frozen desserts.

2. Description of the Related Art

Frozen desserts include ice cream desserts such as ice cream, ice milk and lactice, as well as ice desserts such as ice candy, shaved ice, crushed ice, sherbet and the like, and most of these employ stabilizing agents for various purposes.

The major purpose for using stabilizing agents is to adjust the overrun. In the production steps for some ice cream desserts, ice candy and sherbet, air bubbles are incorporated to form the desired taste texture. By including a suitable amount of a stabilizing agent it is possible to stably incorporate numerous air bubbles during the production steps, to prevent changes occurring during the production steps or during storage, to provide the final product with better overrun properties, and to stabilize the production steps for cost reduction and an improved taste texture.

A second important role for stabilizing agents is that of imparting shape retention by preventing immediate melting of products at ordinary temperature during the processes of distribution and sales of final products and their consumption by consumers.

A third purpose for which stabilizing agents are widely used is to enhance the taste texture and give more body to the products. For example, this includes alteration in the taste texture by imparting thickness and viscosity to ice cream or enhancing ice crystallization for ice candy and sherbet.

In addition to these purposes, stabilizing agents are also used for their function of aiding emulsifying agents such as glycerin fatty acid esters, propylene glycol fatty acid esters and sucrose fatty acid esters, which are used in ice cream to maintain the dispersion of fats and coagulation of fats during freezing, known as demulsification.

As stabilizing agents for frozen desserts there have been commonly used polysaccharides such as guar gum, pectin, tara gum, carob bean gum, tamarind seed polysaccharide, carrageenan, sodium alginate, carboxymethyl cellulose sodium, agar, xanthan gum and gelan gum, as well as gelatin, starch and the like, either alone or in combinations. On the other hand, these conventional stabilizing agents for frozen desserts are also used as gelling agents for jelly, jam and pudding and as thickeners for gravies and sauces. When these substances are used in frozen desserts for such various purposes, it often occurs that the gelling properties and thickening properties affect the taste texture of the final product, and produce such undesirable conditions as gelling and thickening during the production process. In other words, when stabilizing agents have been added to impart such functions, the heavier taste texture due to greater body and viscosity has been unavoidable, whether or not it is desired.

For example, when no stabilizing agent is added to ice candy or sherbet-type products known as ice desserts, the ice crystals become larger, harder and difficult to eat, and therefore stabilizing agents are commonly used to prevent the growth of ice crystals; however, the use of conventional stabilizing agents has resulted in a thickness contributed by the stabilizing agents, and a poorly chewable and heavy taste texture.

Even when conventional stabilizing agents for frozen foods are used as taste texture enhancers, they have not been able to provide body, viscosity and thickness while also giving softness and a refreshing feel, to produce frozen ice desserts with a fragile and light taste texture.

BRIEF SUMMARY OF THE INVENTION

It is an object of the present invention to provide a method for the production of frozen desserts that can provide them with the functions of overrun properties and shape retention that are expected for stabilizing agents in frozen desserts without giving the frozen desserts a feeling of heavy body, viscosity and thickness, and that can provide this while also giving softness and a refreshing feel, in order to produce frozen ice desserts with a fragile and light taste texture.

As a result of much diligent research in light of the circumstances described above, the present inventors have completed the present invention upon finding that, by adding water soluble hemicellulose during the frozen dessert production process, it is possible to provide the functions of overrun properties and shape retention that are expected for stabilizing agents in frozen desserts without giving the frozen desserts a heavier taste texture due to the increased body, viscosity and thickness obtained when using conventional stabilizing agents, while also imparting a light taste texture.

In other words, the present invention provides a method for the production of frozen desserts characterized by the addition of water-soluble hemicellulose.

DETAILED DESCRIPTION OF THE INVENTION

Frozen desserts in the present invention are frozen desserts containing no dairy components or non-acidic frozen desserts containing dairy components. Examples of the former frozen desserts containing no dairy components include ice desserts such as ice candy, shaved ice, crushed ice and sherbet, and examples of the latter non-acidic frozen desserts containing dairy components include ice cream desserts including ice cream, ice milk and lactice, which are classified according to the "Ordinance on Milk and Related Products" based on the components of the starting materials used.

The frozen desserts of the invention are characterized as follows. In the case of ice candy and crushed ice, they are desserts which do not easily dissolve in the mouth or at ordinary temperature, as when conventional stabilizing agents are used, and yet have no viscous taste texture and are not difficult to crush by chewing but crumble easily when chewed, as when no stabilizing agents are used. In the case of sherbet, they are crystalline systems that are easily penetrated by spoons, while also being free of the viscous feel obtained when using conventional stabilizing agents, and having a light taste texture.

In the case of ice cream desserts, they exhibit a smooth feel in the mouth despite their high overrun properties, and do not leave the aftertaste associated with conventional stabilizing agents used to impart overrun properties.

The source of the water-soluble hemicellulose used for the invention is preferably bean-derived hemicellulose, more preferably soybean-derived, and especially soybean cotyledon-derived hemicellulose.

The soybean hemicellulose used may have any molecular weight but is preferably a high molecular type, preferably with an average molecular weight of a few thousand to a few million and particularly 5000 to 1 million, as measured by the limiting dilution method by which the viscosity in a 0.1 molar $NaNO_3$ solution is measured using pullulan (Showa Denko K.K.) as the standard substance. If the molecular weight is too large, the viscosity of the substance increases and can adversely affect the final product, while if it is too low it may not be possible to achieve the function as a stabilizing agent for frozen desserts. Such water-soluble hemicellulose is obtained from the hemicellulose-containing raw material by water extraction or by heated elution under acidic or alkaline conditions, depending on the case, but it may also be obtained by a decomposing elution with an enzyme. The following is an example of a method for the production of water-soluble hemicellulose.

The raw material used may be a plant material, for example, the husks of oily seeds of soybean, palm, coconut, corn or cottonseed with the oil and protein removed, and lees from rice, wheat, beets or potatoes with the starch and sugar removed. If the starting material is soybean, the okara (bean-curd refuse) obtained as a by-product from preparation of tofu (bean curd) and soybean milk or separated soybean protein may be used.

These starting materials may be subjected to heat decomposition at a temperature preferably of from 80 to 130° C., and more preferably from 100 to 130° C., under either acidic or alkaline conditions but preferably at a pH near the isoelectric point of each substance, and after separation of the water-soluble fraction, it may be dried directly or subjected to activated carbon treatment, resin adsorption treatment or alcohol precipitation to remove the hydrophobic substances or low molecular substances, and then dried to yield the desired water-soluble hemicellulose. Decomposition may also be carried out with hemicellulases or the like.

Suitable water-soluble hemicelluloses are those comprising polysaccharides containing galactose, arabinose, xylose, fucose, glucose, rhamnose and galacturonic acid as constituent sugars. Details regarding results of analysis of the constituent components of water-soluble hemicellulose obtained by hydrolysis by hemicellulases may be found in Japanese Unexamined Patent Publication No. 4-325058.

The amount of the water-soluble hemicellulose to be added will differ depending on the type of frozen dessert, but it will usually be 0.001–15 wt %, preferably 0.005–10 wt %, and most preferably 0.005–3 wt % based on the weight of the frozen dessert. Regardless of the amount added, a clear effect may not be achieved if the addition is too little, or the viscosity may be increased to the point of hindering the desired light taste texture if the addition is too great.

There are no particular restrictions on other raw materials to be used for the invention in addition to water-soluble hemicellulose, so long as they are conventionally used for frozen desserts, and examples thereof may include raw dairy materials, vegetable oils, sweeteners, emulsifiers, stabilizing agents, acidifiers, aromatic agents, pigments, salts, fruit juices, fruit pulp, water and the like.

Raw dairy products may include milk, skim milk, fresh cream, butter, dairy fat (butter oil), skim milk powder and whole milk powder, which are used in large amounts primarily in ice cream desserts.

Vegetable oils such as coconut oil, palm oil, rapeseed oil and cocoa butter may be used in ice cream desserts instead of dairy fats due to considerations of shelf-life, stability, taste and cost, and may be used in ice desserts for the purpose of intensifying flavor.

Sweeteners may be added to impart sweetness, and there may be used low sweetness sweeteners such as sucrose, maltose, glucose, invertose, mixed sugar solutions and starch syrup, which also have effects of enhancing the texture, as well as high sweetness sweeteners such as aspartame and stevia, for the sole purpose of imparting sweetness.

Emulsifiers may be used primarily in combination with raw dairy products and vegetable oils, and sucrose fatty acid esters, glycerin fatty acid esters, propylene glycol fatty acid esters, organic acid monoglycerides, lecithin and the like are used for the purposes of preventing protein denaturation, fat dispersion and demulsification. They may generally be added in an amount of about 0.01–0.5 wt % with respect to frozen desserts.

The addition of water-soluble hemicellulose as a stabilizing agent is essential for the invention, but so long as its properties are not impaired there may also be used in combination polysaccharides such as guar gum, pectin, tara gum, carob bean gum, tamarind seed polysaccharides, carrageenan, sodium alginate, carboxymethyl cellulose sodium, agar, xanthan gum and gelan gum, as well as gelatin, starch, microcrystalline cellulose and the like, either alone or in combinations.

Acidifiers, aromatic agents, coloring agents and fruit juices are also important as additives for frozen desserts, but since they serve merely as optional components, they may be appropriately selected according to the preferences of consumers.

As acidifiers there may be used organic acids such as citric acid and lactic acid, as aromatic agents there may be used substances such as vanilla, chocolate and fruits, and as coloring agents there may be used substances such as beta carotene and caramel for ice cream desserts or red cabbage pigment, red rice pigment, violet potato pigment, jasmine pigment and cochineal pigment, for ice desserts. Fruit juices and pulps may usually be used for ice desserts, and examples thereof include citrus fruits such as oranges, as well as pineapples, apples, peaches, grapes and strawberries.

Salts may be used for a buffering effect or for dairy protein protection or as emulsification aids, and there may be used phosphoric acid salts such as sodium hexametaphosphate, as well as sodium citrate and the like.

A production method according to the invention using the aforementioned raw materials will now be explained.

First, the production method of the invention may comprise the conventional frozen dessert production steps, except for dissolution and addition of the water-soluble hemicellulose. The method of dissolving and adding the water-soluble hemicellulose as the essential ingredient of the invention is preferably a method of loading it with the other raw materials into stirred water for dissolution, similar to that for conventional stabilizing agents for frozen desserts such as polysaccharides and proteins, but there are no particular restrictions on the dissolution method so long as the dissolution method gives a dissolved state similar to this method. For example, the method used may involve first dispersion in a raw dairy material such as skim milk or condensed milk, and dissolution during heat sterilization. The timing of the addition is also not limited, but the addition is preferably made prior to homogenization for frozen desserts that are homogenized, such as ice cream desserts.

A standard conventional production process for frozen desserts will now be explained.

The standard production process for ice cream desserts according to a conventional method involves first mixing weighed out amounts of the raw dairy material, vegetable oil, sweetener, emulsifier and stabilizing agent, and dissolving the components to prepare a mix. In this case, the emulsifier, the water-soluble hemicellulose stabilizing agent and the sugar powder material are preferably combined and loaded so as to avoid hardening, and when they are loaded separately the stirring conditions must be appropriately set. The dissolution temperature is preferably 50–80° C.

The mix is then disinfected and sterilized, if necessary. UHT heat treatment is usually used for disinfection and sterilization. The UHT heat treatment used may be by a direct heating or indirect heating system. The heated and dissolved mix is then homogenized. The homogenization pressure is generally 100–180 kg/cm$^2$ in a one stage process, and in a two stage process, about 100 kg/cm$^2$ at the first valve and 20–80 kg/cm$^2$ at the second valve. The homogenization temperature is usually 60–75° C. The homogenization process is also sometimes carried out after heat sterilization.

After completion of the sterilization and homogenization, the system is rapidly cooled to 0–5° C. and temporarily stored for 5–24 hours, as an aging step. The aging stabilizes the components in the mixture by rendering them compatible. After completion of the aging, the aromatic agent and a coloring agent such as beta carotene are added, and the mixture is subjected to freezing. Freezing is a step in which the mix is suddenly and rapidly cooled by a freezer to freeze the moisture while incorporating air therein, and the trace air, air bubbles, ice crystals and fat particles are dispersed in the mix to form a semi-fluid soft cream. When the freezing has been completed, it is packed into a suitable container, wrapped and quick-frozen to −20 to −30° C. It is stored at that temperature for at least one night, for hardening, to obtain the final product.

The standard production process for ice desserts according to a conventional method is as follows.

The common steps for all ice desserts include weighing out the materials and dissolving, homogenizing and heat sterilizing them in the same manner as for ice cream desserts. However, acidifiers and fruit juices are used in somewhat larger amounts as starting materials than for ice cream desserts. In the case of crushed ice, shaved ice and ice candy, the mixture is placed in a mold known as a freezing can for quick freezing. Some ice candy desserts are subjected to forceful stirring with a homomixer or the like to form air bubbles, and then frozen.

After freezing, the ice candy is immediately wrapped as a product, but crushed ice is broken down to an appropriate size when necessary and then wrapped as a product. Shaved ice is prepared by finely scraping a frozen material, packing it into a container and wrapping it as a product. Sherbet, however, is prepared by freezing in the same manner as an ice cream dessert, without freezing the mix of dissolved raw materials directly. When raw dairy materials, vegetable oils, fruit juices, fruit pulp or insoluble solids such as cocoa are used, homogenization is carried out in the same manner as for an ice cream dessert. Finally, a hardening step is carried out for ice desserts in the same manner as for ice cream desserts.

Examples and comparative examples of the present invention will now be provided, with the understanding that the invention is in no way limited by these examples. The "%" values throughout the examples are based on weight.

EXAMPLE 1

Ice cream was prepared using the starting materials listed in Table 1.

TABLE 1

| Material | Composition (%) |
| --- | --- |
| Unsalted butter | 15.0 |
| Skim milk powder | 9.0 |
| Sugar | 10.0 |
| Emulsifier[1] | 0.3 |
| Water-soluble soybean hemicellulose[2] | 0.3 |
| Water | to a total of 100 |

[1]Emulsi-MS, by Riken Vitamins K.K.
[2]Soyafibe-S-LA200, by Fuji Seiyu Oil Co., Ltd.

First, the powder materials were combined into a powder mixture which was then poured into a mixture of butter, that had been heated to 60° C. to melt, and water. This mixture was then heated at 70° C. for 10 minutes and stirred to melt. After subsequent homogenization treatment at a pressure of 150 kg/cm$^2$, it was subjected to heat sterilization in a UHT plate sterilizer at 120° C. for 15 seconds. The sterilized mix was then cooled to 4° C., and aged for 20 hours in a refrigerator to obtain an ice cream mix. The resulting mix was placed in a freezer, and freezing was accomplished with the overrun set to 50% and rotation set to a rotation rate of 100 rpm. The frozen mix was then packed into a paper container with a height of 3 cm, a top diameter of 7 cm and a bottom diameter of 5 cm and allowed to harden overnight at −25° C. to obtain ice cream.

COMPARATIVE EXAMPLE 1

Ice cream was prepared under the same conditions as Example 1, except that no soybean hemicellulose was added.

COMPARATIVE EXAMPLE 2

Ice cream was prepared under the same conditions as Example 1, except that HM pectin (Genupectin BB, by HERCULES) was used instead of soybean hemicellulose.

COMPARATIVE EXAMPLE 3

Ice cream was prepared under the same conditions as Example 1, except that tamarind seed polysaccharide (Bistop D-2034, by Saneigen F.F.I., Inc.) was used instead of soybean hemicellulose.

COMPARATIVE EXAMPLE 4

Ice cream was prepared under the same conditions as Example 1, except that guar gum (Bistop D-20, by Saneigen F.F.I., Inc.) was used instead of soybean hemicellulose.

COMPARATIVE EXAMPLE 5

Ice cream was prepared under the same conditions as Example 1, except that carob bean gum (Locust Bean Gum F, by Saneigen F.F.I., Inc.) was used instead of soybean hemicellulose.

COMPARATIVE EXAMPLE 6

Ice cream was prepared under the same conditions as Example 1, except that kappa carrageenan (Carrageenan CSK-1, by Saneigen F.F.I., Inc.) was used instead of soybean hemicellulose.

COMPARATIVE EXAMPLE 7

Ice cream was prepared under the same conditions as Example 1, except that agar (Ultra Agar AX-100, by Ina Food Industries, Inc.) was used instead of soybean hemicellulose.

The results of evaluating the ice cream desserts prepared under the conditions described above are shown in Table 2.

TABLE 2

| | Overrun | Shape retention | Organoleptic evaluation | | |
|---|---|---|---|---|---|
| | | | Dissolution in mouth | Viscosity | Overall |
| Example 1 | good | good | 8.5 | 9.2 | 8.1 |
| Comp. Ex. 1 | No expected overrun | poor | 7.2 | 7.8 | 5.2 |
| Comp. Ex. 2 | good | good | 7.1 | 7.3 | 7.5 |
| Comp. Ex. 3 | good | good | 6.2 | 5.5 | 6.5 |
| Comp. Ex. 4 | good | good | 5.0 | 5.2 | 5.9 |
| Comp. Ex. 5 | good | good | 4.2 | 4.9 | 6.3 |
| Comp. Ex. 6 | good | good | 6.8 | 6.8 | 6.3 |
| Comp. Ex. 7 | good | good | 7.5 | 8.1 | 7.1 |

In the table, the overrun and shape retention for samples were visually observed by three evaluators, the overrun being determined based on whether the set value was rapidly reached, and the shape retention based on melting after storage at room temperature. The organoleptic evaluations represent averages of evaluations by 10 panelists on a 10 point scale. An overall evaluation was based on a judgment of general preference, with a higher score assigned for better dissolution in the mouth and a higher score assigned for lower viscosity.

As a result, the ice cream of Example 1 in which soybean hemicellulose was used as the stabilizing agent exhibited easier overrun and more satisfactory dissolution in the mouth, and had none of the viscous texture of Comparative Examples 2–7 in the mouth.

EXAMPLE 2

Crushed ice was prepared with the composition shown in Table 3.

TABLE 3

| Material | Composition (%) |
|---|---|
| 1/5 concentrated lemon juice | 0.3 |
| Aspartame | 0.05 |
| Citric acid (crystals) | 0.5 |
| Lemon spice | 0.18 |
| Tamarind seed polysaccharide[3] | 0.02 |
| Trisodium citrate | 0.05 |
| Water-soluble soybean hemicellulose[4] | 0.1 |
| Water | to a total of 100 |

[3]Bistop D-2034, by Saneigen F.F.I., Inc.
[4]Soyafibe-S-DN, by Fuji Oil Co., Ltd.

The starting powders were combined and stirred to dissolution at 80° C. for 10 minutes, after which the 1/5 concentrated lemon juice, aspartame, citric acid (crystals) and lemon spice were added to prepare a mix. This was then packed into a freezing can for quick freezing. After the freezing, the contents were removed from the freezing can, crushed and packed into a plastic cup and stored overnight in a freezer at −30° C. to obtain crushed ice in a cup.

COMPARATIVE EXAMPLE 8

Crushed ice was prepared under the same conditions as Example 2, except that no soybean hemicellulose was used.

COMPARATIVE EXAMPLE 9

Crushed ice was prepared under the same conditions as Example 2, except that HM pectin (Genupectin BB, by HERCULES) was used instead of soybean hemicellulose.

COMPARATIVE EXAMPLE 10

Crushed ice was prepared under the same conditions as Example 2, except that tamarind seed polysaccharide (Bistop D-2034, by Saneigen F.F.I., Inc.) was used instead of soybean hemicellulose.

COMPARATIVE EXAMPLE 11

Crushed ice was prepared under the same conditions as Example 2, except that guar gum (Bistop D-20, by Saneigen F.F.I., Inc.) was used instead of soybean hemicellulose.

COMPARATIVE EXAMPLE 12

Crushed ice was prepared under the same conditions as Example 2, except that agar (Ultra Agar AX-100, by Ina Food Industries, Inc.) was used instead of soybean hemicellulose.

The results of evaluating the crushed ice desserts prepared under the conditions described above are shown in Table 4.

TABLE 4

| | Shape retention | Organoleptic evaluation | | |
|---|---|---|---|---|
| | | Crushability | Viscosity | Overall |
| Example 2 | good | 9.2 | 9.1 | 9.3 |
| Comp. Ex. 8 | poor | 2.2 | 9.3 | 6.6 |
| Comp. Ex. 9 | good | 8.2 | 6.3 | 7.9 |
| Comp. Ex. 10 | good | 6.5 | 5.8 | 5.6 |
| Comp. Ex. 11 | good | 6.6 | 5.6 | 5.9 |
| Comp. Ex. 12 | good | 6.2 | 6.9 | 6.5 |

In the table, the shape retention for samples were visually observed by three evaluators, and was based on melting after storage at room temperature. The organoleptic evaluations represent averages of evaluations by 10 panelists on a 10-point scale. An overall evaluation was based on a judgment of general preference, with a higher score assigned for easier crushability and a higher score assigned for lower viscosity.

As a result, the crushed ice of Example 2 in which soybean hemicellulose was used as the stabilizing agent had the most desirable taste texture, which was a taste texture that did not easily dissolve in the mouth but was easily broken up when chewed.

EXAMPLE 3

Sherbet was prepared with the composition shown in Table 5.

TABLE 5

| Material | Composition (%) |
|---|---|
| 1/5 strawberry juice | 3.0 |
| Strawberry puree | 8.0 |
| Starch syrup | 12.0 |
| Citric acid (crystals) | 8.0 |
| Strawberry spice | 0.12 |
| Trisodium citrate | 0.05 |
| Water-soluble soybean hemicellulose[5] | 0.2 |
| Water | to a total of 100 |

[5]Soyafibe-S-DA100, by Fuji Seiyu Oil Co., Ltd.

The starting powders were combined and the powder mixture was poured into a solution comprising a mixture of the starch syrup, 1/5 strawberry juice, strawberry puree and water, and after heating and stirring the mixture at 80° C. for 10 minutes, it was homogenized with a homogenizer at 100 kg/cm². This was then stored in a refrigerator at 5° C. overnight and then subjected to freezing under the same conditions as Example 1. The frozen mixture was packed into a plastic cup and quickly frozen to obtain sherbet.

COMPARATIVE EXAMPLE 13

Sherbet was prepared under the same conditions as Example 3, except that no soybean hemicellulose was used.

COMPARATIVE EXAMPLE 14

Sherbet was prepared under the same conditions as Example 3, except that LM pectin (Genupectin 102AS, by HERCULES) was used instead of soybean hemicellulose.

COMPARATIVE EXAMPLE 15

Sherbet was prepared under the same conditions as Example 3, except that tamarind seed polysaccharide (Bistop D-2034, by Saneigen F.F.I., Inc.) was used instead of soybean hemicellulose.

COMPARATIVE EXAMPLE 16

Sherbet was prepared under the same conditions as Example 3, except that guar gum (Bistop D-20, by Saneigen F.F.I., Inc.) was used instead of soybean hemicellulose.

COMPARATIVE EXAMPLE 17

Sherbet was prepared under the same conditions as Example 3, except that a combination of tamarind seed polysaccharide and guar gum in a proportion of 1:1 was used instead of soybean hemicellulose.

The results of evaluating the sherbet desserts prepared under the conditions described above are shown in Table 6.

TABLE 6

| | | Organoleptic evaluation | | | |
| | Condition of mix | Spoon penetration | Dissolution in mouth | Viscosity | Overall |
|---|---|---|---|---|---|
| Example 3 | good | 8.4 | 9.1 | 8.3 | 9.6 |
| Comp. Ex. 13 | rapid settling of solids | poor | 8.3 | 8.6 | 7.0 |
| Comp. Ex. 14 | good | 9.0 | 8.7 | 7.1 | 8.3 |
| Comp. Ex. 15 | coagulation | 8.3 | 6.0 | 5.9 | 6.1 |
| Comp. Ex. 16 | good | 7.9 | 6.4 | 5.0 | 7.9 |
| Comp. Ex. 17 | good | 7.8 | 8.1 | 7.8 | 8.1 |

In the table, the condition of each mix was determined by examining the rate of settling and the condition of coagulation upon cooling to 5° C. after homogenization. The organoleptic evaluations represent averages of evaluations by 10 panelists on a 10-point scale. An overall evaluation was based on a judgment of general preference, with a higher score assigned for easier spoon penetration and better dissolution in the mouth, and a higher score assigned for lower viscosity.

As a result, the sherbet of Example 3 in which soybean hemicellulose was used as the stabilizing agent exhibited the best taste texture, with a better spoon penetration, i.e. soft cream-like crystallinity, and a smooth aftertaste.

EXAMPLE 4

Ice candy was prepared with the composition shown in Table 7.

TABLE 7

| Material | Composition (%) |
|---|---|
| 1/5 Valencia orange juice | 3.0 |
| Starch syrup | 15.0 |
| Citric acid (crystals) | 0.7 |
| Orange spice | 0.13 |
| Trisodium citrate | 0.12 |
| Carotene base | 0.05 |
| Water-soluble soybean hemicellulose[6] | 0.2 |
| Water | to a total of 100 |

[6] Soyafibe-S-DA300, by Fuji Oil Co., Ltd.

The starting powders were combined and the mixture was poured into a solution comprising a mixture of the starch syrup and water, and after stirring to dissolution at 80° C. for 10 minutes, the 1/5 Valencia orange juice, orange spice and carotene base were added to make an ice candy mix. The mix was cooled to 5° C. and stored overnight, and then packed into a freezing can for quick freezing. Upon further storage overnight at −22° C. and sampling the following day, the ice candy was found to have a satisfactory taste texture with good dissolution in the mouth and good crunching properties.

The present invention exhibits the effects of providing the functions of overrun properties and shape retention which are desired properties of stabilizing agents for frozen desserts, without giving the frozen desserts heavy taste textures, including heavy body, viscosity and thick taste, while also imparting a soft, smooth taste texture and a light, fragile taste texture for ice desserts.

We claim:

1. A production method for a frozen dessert wherein the improvement comprises adding water-soluble hemicellulose derived from soybeans to standard frozen dessert preparations as a stabilizing agent.

2. A production method according to claim 1, characterized in that the frozen dessert contains no dairy components.

3. A production method according to claim 1 or 2, wherein the frozen dessert is an ice dessert.

4. A production method according to claim 3, wherein the ice dessert is ice candy, shaved ice, crushed ice or sherbert.

5. A production method according to claim 1, wherein the frozen dessert contains dairy components and is non-acidic.

6. A production method according to claim 5, wherein the frozen dessert is an ice cream dessert.

* * * * *